(12) United States Patent
Salo

(10) Patent No.: US 9,537,995 B2
(45) Date of Patent: Jan. 3, 2017

(54) METHOD AND APPARATUS FOR HANDHELD DEVICE CONTROL BY ACCESSORY DEVICE

(71) Applicant: Nokia Corporation, Espoo (FI)

(72) Inventor: Antti Salo, Lohja (FI)

(73) Assignee: Nokia Technologies Oy, Espoo (FI)

( * ) Notice: Subject to any disclaimer, the term of this patent is extended or adjusted under 35 U.S.C. 154(b) by 382 days.

(21) Appl. No.: 14/101,874

(22) Filed: Dec. 10, 2013

(65) Prior Publication Data

US 2015/0163338 A1 Jun. 11, 2015

(51) Int. Cl.
*H04B 1/38* (2015.01)
*H04M 1/725* (2006.01)
*H04M 1/02* (2006.01)

(52) U.S. Cl.
CPC ....... *H04M 1/72527* (2013.01); *H04M 1/0283* (2013.01)

(58) Field of Classification Search
CPC ....... H04B 5/0012; H04B 5/0075; H05K 5/00; H05K 5/0017; H04M 1/72527; H04M 1/0283
See application file for complete search history.

(56) References Cited

U.S. PATENT DOCUMENTS

| | | | |
|---|---|---|---|
| 6,633,241 B2 * | 10/2003 | Kaikuranta | H03K 17/98 341/20 |
| 6,980,777 B2 | 12/2005 | Shepherd et al. | |
| 7,747,007 B2 | 6/2010 | Hyun et al. | |
| 9,026,187 B2 * | 5/2015 | Huang | H05K 5/0086 455/41.1 |
| 2009/0312051 A1 | 12/2009 | Hansson et al. | |
| 2010/0200456 A1 | 8/2010 | Parkinson | |
| 2010/0238119 A1 | 9/2010 | Dubrovsky et al. | |
| 2011/0090626 A1 | 4/2011 | Hoellwarth et al. | |
| 2012/0039023 A1 * | 2/2012 | Renwick | G06F 1/1626 361/679.01 |
| 2012/0244848 A1 * | 9/2012 | Ghaffari | H04M 1/04 455/415 |
| 2013/0076614 A1 | 3/2013 | Ive et al. | |
| 2013/0149964 A1 * | 6/2013 | Kreiner | G06F 1/1632 455/41.2 |

(Continued)

FOREIGN PATENT DOCUMENTS

| | | |
|---|---|---|
| CN | 2406425 Y | 11/2000 |
| EP | 1301011 | 4/2003 |

(Continued)

OTHER PUBLICATIONS

International Search Report for International Application No. PCT/FI2014/050882—Date of Completion of Search: Jan. 23, 2015, 3 pages.

(Continued)

*Primary Examiner* — Nguyen Vo
(74) *Attorney, Agent, or Firm* — Locke Lord LLP

(57) ABSTRACT

A method and apparatus in which in an accessory device is adapted for attaching to a handheld device and the accessory device. A coupling is formed with a first input of the handheld device. User input is formed. A predetermined signal is formed to the first input of the handheld device responsive to the receiving of user input using the formed coupling independently of any conductive coupling with the handheld device.

18 Claims, 2 Drawing Sheets

(56) References Cited

U.S. PATENT DOCUMENTS

| | | | | |
|---|---|---|---|---|
| 2013/0181935 A1* | 7/2013 | McKenzie | ............ | G06F 3/044 345/174 |
| 2014/0055363 A1* | 2/2014 | Meierling | ............ | G06F 1/1662 345/169 |

FOREIGN PATENT DOCUMENTS

| | | |
|---|---|---|
| EP | 1971111 | 9/2008 |
| EP | 2701033 | 2/2014 |

OTHER PUBLICATIONS

Written Opinion of the International Searching Authority for International Application No. PCT/FI2014/050882—Date of Completion of Opinion: Jan. 23, 2015, 5 pages.

* cited by examiner

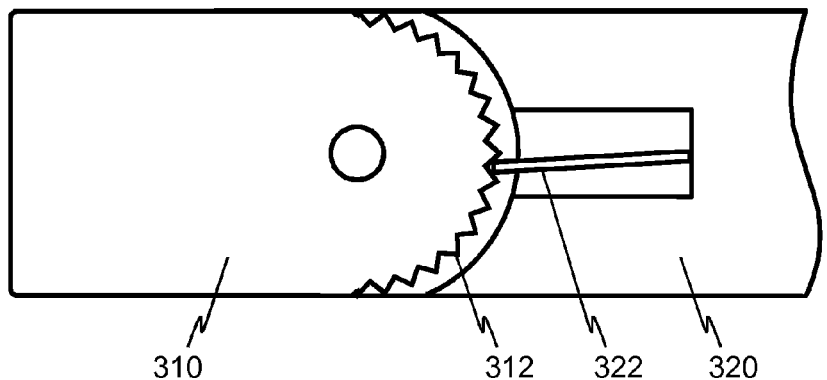

410 — Form a coupling from an attached accessory device to a handheld device

420 — Receive user input with accessory device

430 — Form a predetermined signal to the first input of the handheld device responsive to the receiving of user input using the formed coupling independently of any conductive coupling with the handheld device

Fig. 5    500

510 — Receive information with a first input of the handheld device from an attached accessory device independently of any conductive coupling with the accessory device 520 — Identify in the received information a predetermined signal indicative of a first user action and accordingly controlling operation in the handheld device

METHOD AND APPARATUS FOR HANDHELD DEVICE CONTROL BY ACCESSORY DEVICE

TECHNICAL FIELD

The present application generally relates to handheld device control by an accessory device.

BACKGROUND

This section illustrates useful background information without admission of any technique described herein representative of the state of the art. Accessory covers are provided for portable devices such as mobile phones for protection against mechanical loading, humidity and also for personalization. There are also smart covers that comprise electric circuitries and possibly further user controls for expanding capabilities of mobile phones.

Mobile phones have developed towards earlier computers so that the processing and memory capabilities have enhanced, while the overall size is still somewhat limited by the need to maintain portability. Modern smart phones are also increasingly often equipped with a large touch display that is used to present information and take user input. While various carry-on pouches were provided for earlier keypad equipped mobile phones with a transparent plastics window for seeing through the display and using the keys through the window, the modern mobile phones are more often padded only by their rear and sides with a silicon cover. Any keys located on the edges of the phones are then used through respective openings in the silicon cover or be pressing through a wall of the silicon cover, whereas the touch screen is readily exposed and available to the user.

SUMMARY

Various aspects of examples of the invention are set out in the claims.

According to a first example aspect of the present invention there is provided an accessory device, wherein the accessory device is adapted for attaching to a handheld device and the accessory device comprises:

a user input;

a coupling element configured to form a coupling with a first input of the handheld device; and wherein the user input and coupling element are collectively configured to form a predetermined signal to the first input of the handheld device responsive to a first user action and independently of any conductive coupling with the handheld device.

The accessory device may be a cover. The cover may be a carrying case. The cover may be a pouch. The cover may be a silicon cover. The cover may comprise elastic fabric. The cover may be constructed of elastic fabric.

The accessory device may be referred to as an interactive accessory device as the accessory device may enable interaction between a user and the handheld device via the accessory device.

The accessory device may be configured to enable the handheld device to detect deformation of the accessory device when attached to the handheld device by using the coupling element. The deformation may be incurred by a user of the handheld device bending, twisting, squeezing or stretching the accessory device. The enabling of the handheld device to detect the deformation of the accessory device may be provided without any data connection between the handheld device and the accessory device.

The accessory device may further comprise an attachment indicator configured to enable the handheld device to detect, using one or more second inputs of the handheld device, that the accessory device is attached to the handheld device. The second inputs may comprise the first input.

The coupling element may be configured to couple with one of the first and second inputs of the handheld device that is not used by the attachment indicator. The one of the first and second input may be configured to make a binary determination. The binary determination may be detected from at least one of: a proximity sensor being covered or uncovered; a camera view being modified or unmodified; an ambient light sensor being blocked or unblocked; a given sound being produced; the handheld device being nudged perceivably by an accelerometer; a given key being pressed or released; and a dedicated sensor such as a Hall sensor being affected.

The coupling element may be configured to form a capacitive coupling.

The coupling element may be configured to form a capacitive coupling with one or more predetermined parts of a capacitive touch screen in the handheld device. The capacitive coupling may be formed using transparent elements configured to extend onto the capacitive touch screen, when the accessory device is attached to the handheld device. The capacitive coupling may be formed to extend to an edge of the handheld device.

The accessory device may comprise conductive material configured to connect a user's finger to the capacitive touch screen via the coupling element from a position outside the capacitive touch screen.

The coupling element may be configured to form a multi touch pattern that is unlikely to be created by human fingers. The pattern may have such a fine pitch that it is difficult or impossible to create by the user touching the touch screen with her fingers. The pattern may comprise four or more discrete capacitive contact points. The touch screen may be rectangular so that it has two long edges and two short edges. The pattern may be configured to reside on the short edge of the touch screen.

The accessory device may comprise a flip that is rotatable between an opened position and closed position. In the closed position, the flip may be configured to cover the touch screen in part or entirely. The coupling element may comprise a part in the flip, configured to enable the handheld device to detect the opening of the flip.

Alternatively, the conductive pattern on top of touch screen could be used for grip detection as an input for context aware applications. The grip detection may be usable for determination of the desired orientation of displaying content by the handheld device.

The coupling element may be configured to form an optical coupling. The coupling element may be configured to form an optical coupling with any one or more of a camera; an ambient light sensor; and an optical proximity sensor.

The coupling element may be configured to form an acoustic coupling. The coupling element may be configured to produce a predetermined acoustic signal that is detectable by the handheld device.

The coupling element may be configured to form a magnetic coupling. The coupling element may be configured to form a magnetic coupling with a magnetometer in the handheld device.

The coupling element may be configured to form an acceleration coupling. The coupling element may be configured to form the acceleration coupling by causing temporary acceleration to the handheld device.

The coupling element may be configured to employ the first input of the handheld device to a purpose other than that the first input has when the accessory device is not attached to the handheld device.

The accessory device may comprise an electric circuitry. The electric circuitry may be powered by an energy source included in the accessory cover such as a battery. Alternatively or additionally, the electric circuitry may be electrified using power obtained from the handheld device. Energy may be transferred from the handheld device through any data connector with power output, such as universal serial bus on the go; memory card interface; through separate power connector; and/or the power may be harvested from a wireless transmission of the handheld device.

There are numerous ways to manufacture the accessory device flexible; pivotable; soft and/or stretchable. The accessory device may include plastic or elastic substrate. The accessory device may include stretchable conductors or arrangement of rigid conductors that enables the structure to deform. Various gels, fabrics, leather, elastomers or foams may be used as the substrate. The shape of the substrate may be configured to further increase the experienced amount of deformation. The shape of the conductors may be configured to increase the maximum allowed amount of deformation of used conductors. The conductors may be formed using any of: copper; silver; gold; indium tin oxide; carbon nanotubes; graphene; and silver nanowires.

According to a second example aspect of the present invention, there is provided a handheld device adapted for use with the accessory device of the first example aspect, wherein the handheld device comprises:

a first input configured to input information for use by the handheld device; and a processor configured to receive using the first input a predetermined signal from the accessory device indicative of a first user action independently of any conductive coupling with the accessory device;

wherein the processor is further configured to identify the predetermined signal and to accordingly control operation in the handheld device.

The handheld device may be selected from a group consisting of: a mobile telephone; a navigation device; a game device; an electronic book; a camera; a portably music player; a tablet computer and a portable video player.

The processor may be further configured to identify that the accessory device is attached to the handheld device. The handheld device may further comprise one or more second inputs. The processor may be further configured to identify that the accessory device is attached to the handheld device using the one or more second inputs. The processor may be further configured to change the function of the first input.

One or more of any of the first and second inputs of the handheld device may be configured to make a binary determination. The binary determination may be detected from at least one of: a proximity sensor being covered or uncovered; a camera view being modified or unmodified; an ambient light sensor being blocked or unblocked; a given sound being produced; the handheld device being nudged perceivably by an accelerometer; a given key being pressed or released; and a dedicated sensor such as a Hall sensor being affected.

The handheld device may comprise a capacitive screen. The processor may be configured to use the capacitive screen to implement at least one of the first and second inputs. The processor may be configured to use an edge or edge region of the capacitive screen to the implementing of the at least one of the first and second inputs. The processor may be configured to identify the predetermined signal from a predetermined capacitive pattern induced on the capacitive screen by the accessory device.

According to a third example aspect of the present invention there is provided a method in an accessory device that is adapted for attaching to a handheld device and the accessory device, comprising:

forming a coupling with a first input of the handheld device;

receiving user input; and forming a predetermined signal to the first input of the handheld device responsive to the receiving of user input using the formed coupling independently of any conductive coupling with the handheld device.

According to a fourth example aspect of the present invention there is provided a method in handheld device adapted for use with an accessory device, wherein the method comprises:

receiving information with a first input of the handheld device from an accessory device independently of any conductive coupling with the accessory device; and identifying in the received information a predetermined signal indicative of a first user action and accordingly controlling operation in the handheld device.

According to a fifth example aspect of the present invention there is provided a computer program product comprising a computer-readable medium bearing computer program code embodied therein for use with a handheld device adapted for use with an accessory device, wherein the computer program produced comprises:

code for receiving information with a first input of the handheld device from an accessory device independently of any conductive coupling with the accessory device; and code for identifying in the received information a predetermined signal indicative of a first user action and accordingly controlling operation in the handheld device.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which:

FIG. 3 shows a schematic drawing of a coupling element according to an example embodiment;

FIG. 4 shows a flow chart of a process in a handheld device, according to an example embodiment of the invention; and FIG. 5 shows a flow chart of a process in an accessory device, according to an example embodiment of the invention.

DETAILED DESCRIPTION OF THE DRAWINGS

An example embodiment of the present invention and its potential advantages are understood by referring to FIGS. 1 through 5 of the drawings. In this document, like reference signs denote like parts or steps.

Figure 1:
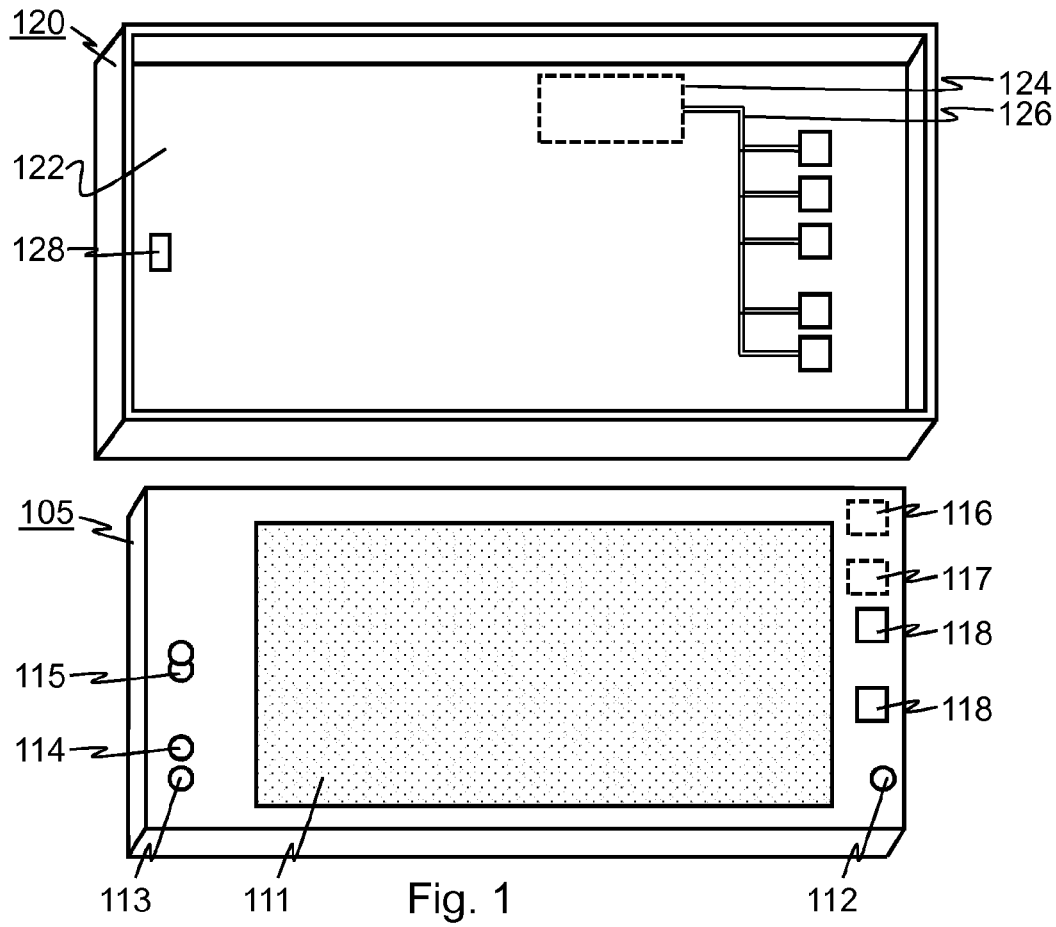
FIG. 1 shows a system of an example embodiment of the invention.

FIG. 1 shows a system 100 of an example embodiment of the invention. The system 100 comprises a handheld device 105 comprising inputs 110 such as a touch screen 111, a microphone 112, an ambient light sensor 113, a camera 114, a proximity sensor 115, a magnetometer 116, an accelerometer 117 and one or more keys 118. The system 100 further comprises an accessory device 120 comprising a receptacle 122 for the handheld device, a user input 124, a coupling element 126 and an attachment indicator 128.

The receptacle 122 is, for example, a space defined by continuous side walls, clips, hooks or e.g. magnetic attachments, for at least partly receiving the handheld device 105 and/or for attaching to the handheld device 105.

The user input 124 is, for example, a conductive surface coupled using the coupling element 126 to the handheld device 105 or to the touch screen 111 of the handheld device 105. The user input 124 comprises in an example embodiment a force sensitive coupling element configured to selectively couple or uncouple a capacitively detectable object to the touch screen 111. In an example embodiment, the user input 124 has two or more different functions. The user input 124 can be formed using a rotatable or pivotable part such as a flip that has a first position in which it protects at least a portion of the touch screen 111 and a second position in which it is not protecting the at least portion of the touch screen 111.

In an example embodiment, the accessory device 120 has more than one of the user inputs 124. Different user inputs 124 can be implemented using different and/or same techniques.

In an example embodiment, the coupling element 126 comprises a connector configured to form a connection e.g. between a capacitively detectable object and a capacitive sensor such as a sensor of a capacitive touch screen. For instance, FIG. 1 illustrates the coupling element as a multi-branch conductor with five different patches configured to each align with at least one capacitive sensor of the touch screen 111. The coupling element 126 and the interactive element 128 in FIG. 1 are carried by a transparent film that settles onto the side of the handheld device 105 that has the touch screen. Notice that the capacitive sensors of the touch screen are illustrated as dots in the touch screen 111. In another example embodiment, there is no film covering the entire top side (as seen in FIG. 1) of the handheld device 105, but instead the coupling element 126 and the interactive element are carried by a transparent strip that settles onto the opposite ends of the handheld device 105 top side.

In an example embodiment, the attachment indicator 128 is a part configured to interact with one or more inputs 110 of the handheld device 105 so as to indicate to the handheld device that the accessory device is attached to the handheld device.

The various inputs 110 of the handheld device 105 can be used by the accessory device 120 in different ways as will be explained with further detail in the following. In sake of clarity, the structure of the handheld device 105 will be next described with reference to FIG. 2.

Figure 2:
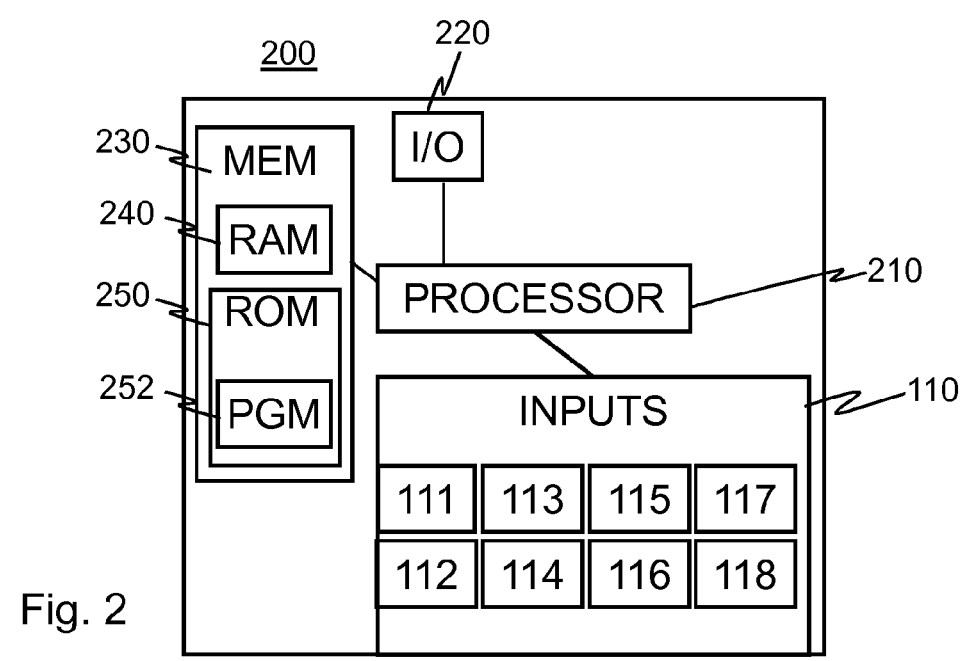
FIG. 2 shows a schematic drawing of an apparatus suited for operation as a handheld device of FIG. 1.

FIG. 2 shows a schematic drawing of an apparatus 200 suited for operating as the handheld device 105 of FIG. 1.

The apparatus 200 comprises a communication interface 220, a processor 210 coupled to the communication interface module 220, a memory 230 coupled to the host processor 210, and the inputs 110 described with reference to FIG. 1.

The memory 230 comprises a work memory 240 and a non-volatile memory 250 such as a read-only memory, flash memory, optical or magnetic memory. In the memory 230, typically at least initially in the non-volatile memory, there is stored software 252 operable to be loaded and executed by the host processor 210. In an example embodiment, the software 252 comprises one or more software modules. The software 252 can be in the form of a computer program product that is software stored in a memory medium.

It shall be understood that any coupling in this document refers to functional or operational coupling; there may be intervening components or circuitries in between coupled elements.

A skilled person appreciates that in addition to the elements shown in FIG. 2, the apparatus 200 can be implemented in various ways e.g. to comprise other elements, further input/output (I/O) circuitries, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 200 may comprise a disposable or rechargeable battery (not shown) for powering the apparatus when external power if external power supply is not available.

The use of the various inputs 110 of the handheld device 105 by the accessory device 120 in different ways will next be explained with further detail.

As shown in FIGS. 1 and 3, the accessory device 120 can be a cover such as an elastic cover (e.g. a silicon cover). Alternatively, the accessory device 120 can be formed as a carrying case or as a pouch.

With a flexible accessory device, it is possible to configured the accessory device 120 to enable the handheld device 105 to detect deformation of the accessory device 120 when attached to the handheld device 105 by using the coupling element 126. The deformation can be incurred by a user of the handheld device 105 e.g. by bending, twisting, squeezing or stretching the accessory device. The enabling of the handheld device 105 to detect the deformation of the accessory device 120 can be provided without any data connection between the handheld device 105 and the accessory device 120. Instead, the existing inputs 110 of the handheld device 105 can be employed.

In an example embodiment, the accessory device 120 comprises the attachment indicator 128 configured to enable the handheld device 105 to detect, using one or more second inputs of the handheld device 105, that the accessory device is attached to the handheld device. The second inputs may comprise the first input.

In this context, the term first input is used to refer to the portion of the inputs 110 used for passing user input from the accessory device 120 to the handheld device 105 e.g. using the coupling element 126. The second input is used to refer to the portion of the inputs 110 used by the attachment indicator 128. For instance, the attachment indicator 128 can be configured to use certain capacitive sensors in the touch screen 111 of the handheld device 105 and the user input can be provided to the handheld device 105 using some (typically other) capacitive sensors in the touch screen 111. There can be also some overlap here as e.g. capacitive sensors can be used to distinguish different levels of capacitive detection so that the attachment indicator 128 causes a first level of a capacitive detection and the attachment indicator 128 in conjunction with the coupling element 126 when used for providing user input causes a second level of capacitive detection, different than the first level of capacitive detection.

In an example embodiment, the coupling element 126 is configured to couple with one of the first and second inputs of the handheld device that is not used by the attachment indicator 128. The one of the first and second input can be configured to make a binary (e.g. on/off type) determination. The binary determination can be detected from at least one of: a proximity sensor being covered or uncovered; a camera view being modified or unmodified; an ambient light sensor being blocked or unblocked; a given sound being produced; the handheld device being nudged perceivably by an accelerometer; a given key being pressed or released; and a dedicated sensor such as a Hall sensor being affected.

In an example embodiment, the coupling element 126 is configured to form a capacitive coupling. For instance, the coupling element 126 can be configured to form a capacitive coupling with one or more predetermined parts of a capacitive touch screen 111 in the handheld device 106. The capacitive coupling can be formed using transparent elements configured to extend onto the capacitive touch screen 111, when the accessory device 120 is attached to the handheld device 105. The capacitive coupling can be formed to extend to an edge of touch screen 111.

In an example embodiment, the accessory device 120 comprises conductive material configured to connect a user's finger to the capacitive touch screen 111 via the coupling element 126 from a position outside the capacitive touch screen 111. For instance, a conductive patch can be provided at given portion of the accessory device 120 and functionally connected to a given portion of the touch screen 111 via the coupling element 126 to provide user input by the accessory device 120 to the handheld device 105.

In an example embodiment, the coupling element 126 is configured to form a multi touch pattern that is unlikely to be created by human fingers. The pattern can be configured to comprise e.g. four or more discrete capacitive contact points. The pattern can have such a fine pitch that it is difficult or impossible to create by the user touching the touch screen with her fingers. In an example embodiment, the touch screen is rectangular so that it has two long edges and two short edges and the pattern is configured to reside on the short edge of the touch screen so that space on the short edge would not normally suffice for four or more discrete capacitive contacts caused by the user's fingers.

In an example embodiment, the accessory device comprises a flip that is rotatable between an opened position and closed position. In the closed position, the flip is configured to cover the touch screen 111 in part or entirely. The coupling element 126 can be formed to comprise a part in the flip to enable the handheld device 105 to detect the opening of the flip.

Alternatively, the conductive pattern on top of touch screen can be used for grip detection as an input for context aware applications. The grip detection can be used e.g. for determination of the desired orientation of displaying content by the handheld device.

In an example embodiment, the coupling element 126 is configured to form an optical coupling. The coupling element can be configured to form, for instance, an optical coupling with any one or more of a camera; an ambient light sensor; and an optical proximity sensor. In this example embodiment, e.g. deforming of the accessory device 120 can alter the optical coupling e.g. by bringing a reflective part in the accessory device 120 in view of an optical input of the handheld device 105 and/or by somehow changing the view of an optical input. For instance, an aperture can be formed in the accessory device 120 so that it normally is aligned with the optical input but on deforming the accessory device 120, the aperture changes shape or size so that the view of the optical input is restricted from one or more directions in a manner that is detectable by the handheld device 105.

In an example embodiment, the coupling element is configured to form an acoustic coupling. The coupling element 126 can be configured to produce a predetermined acoustic signal that is detectable by the handheld device 105. For example, the accessory device 120 can be configured to issue a given dragging sound or to issue distinct sounds such as clicks (e.g. by a gear wheel jumping teeth over a fixed abutting part) that are detectable by the handheld device 105 using the microphone 112.

In an example embodiment, the coupling element 126 is configured to form a magnetic coupling. The coupling element 126 can be configured to form a magnetic coupling with the magnetometer 116 in the handheld device 105. For instance, in some implementations, an offset of a magnet by just one millimeter can be detected by a magnetometer. Suitably forming the accessory device 120 it is possible to enable e.g. twisting the accessory device 120 so that a magnet therein moves in a manner detectable by the magnetometer 116 in the handheld device 105.

In an example embodiment, the coupling element 126 is configured to form an acceleration coupling. The coupling element 126 can be configured to form the acceleration coupling by causing temporary acceleration to the handheld device 105. For instance, making use of the law of inertia, the accessory device 120 can be equipped with a movable mass that is accelerated and stopped. Either or both the accelerating of the movable mass and the stopping thereof can be detected by the accelerometer 117 of the handheld device 105.

In an example embodiment, the coupling element 126 is configured to employ the first input of the handheld device 105 to a purpose other than that the first input has when the accessory device is not attached to the handheld device. For instance, an ambient light sensor or capacitive sensor of the touch screen can be used alone or in conjunction with other inputs to signal a given user input to the handheld device. As an example, when the attachment indicator 128 is provided to indicate the presence of the accessory device 120, the handheld device can change its interpretation of signals arriving from the inputs 110 used by the coupling device 126. In one example embodiment, though, if more than one of the inputs 110 are used by the coupling device 126, the handheld device 105 can still interpret the signal of a single input in an unchanged manner.

In an example embodiment, the accessory device 120 lacks active electric circuitries i.e. there are no components that require supply of electricity to operate. In this context, a mere conductive loop or extension from a capacitive sensor is not understood as an active electric circuitry. In an alternative example embodiment, the accessory device 120 comprises an electric circuitry. The electric circuitry can be powered by an energy source included in the accessory cover 120 such as a battery. Alternatively or additionally, the electric circuitry can be electrified using power obtained from the handheld device 105 or from another external source. Energy can be transferred to the accessory device 120 through any data connector with power output, such as universal serial bus on the go; memory card interface; through separate power connector; and/or the power can be harvested from a wireless transmission of the handheld device.

There are numerous ways to manufacture the accessory device 120 flexible; pivotable; soft and/or stretchable. In an example embodiment, the accessory device 120 includes a plastic or elastic substrate. In an example embodiment, the accessory device 120 includes stretchable conductors or arrangement of rigid conductors that enables the structure to deform. Various gels, elastomers or foams can be used to form the substrate. In an example embodiment, the shape of the substrate is configured to further increase the experienced amount of deformation. The shape of the conductors can be configured to increase the maximum allowed amount of deformation of used conductors. For example, the conductors can be formed using any of: copper; silver; gold; indium tin oxide; carbon nanotubes; graphene; and silver nanowires.

FIG. 3 shows a schematic drawing of a coupling element 300 according to an example embodiment. The coupling element 300 is configured to produce vibration and/or sound when two parts 310, 320 turn with respect to each other. This may be the case with a pivotable flap, but also or alternatively with a deformable part that can be e.g. flexed by the user. The vibration and/or sound is created using a gear section 312 and respective abutting tongue 322 that is configured to snap over teeth of the gear section 312 when the two parts 310, 320 turn with respect to each other.

FIG. 4 shows a flow chart of a process 400 in a handheld device, according to an example embodiment of the invention. The process comprises steps:

410: Form a coupling from an attached accessory device to a handheld device;

420: Receive user input with accessory device; and

430: Form a predetermined signal to the first input of the handheld device responsive to the receiving of user input using the formed coupling independently of any conductive coupling with the handheld device.

FIG. 5 shows a flow chart of a process 500 in an accessory device, according to an example embodiment of the invention. The process comprises steps:

510: Receive information with a first input of the handheld device from an attached accessory device independently of any conductive coupling with the accessory device; and 520: Identify in the received information a predetermined signal indicative of a first user action and accordingly controlling operation in the handheld device.

Without in any way limiting the scope, interpretation, or application of the claims appearing below, a technical effect of one or more of the example embodiments disclosed herein is that an interactive accessory such as accessory cover can be attached to a handheld device to interact therewith without need for any data connection between the interactive accessory and the handheld device. Another technical effect of one or more of the example embodiments disclosed herein is that an interactive accessory such as accessory cover can be attached to a handheld device to interact therewith without need for any power connection between the interactive accessory and the handheld device. Another technical effect of one or more of the example embodiments disclosed herein is that an interactive accessory such as accessory cover can be attached to a handheld device to interact therewith without need for any electrical power source or storage in the interactive accessory.

Embodiments of the present invention may be implemented in software, hardware, application logic or a combination of software, hardware and application logic. The software, application logic and/or hardware may reside on non-volatile memory 250. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

What is claimed is:

1. An accessory device, wherein the accessory device is adapted for attaching to a handheld device, and the accessory device comprises:

a user input;

a coupling element configured to form a coupling with a first input of the handheld device, wherein the first input of the handheld device is at least one of a proximity sensor, a camera, an ambient light sensor, a microphone, an accelerometer, a magnetometer or one or more input keys; and wherein the user input and coupling element of the accessory device are collectively configured to convey a predetermined signal from the accessory device to the first input of the handheld device, wherein conveying of the predetermined signal is in response to a first user action and occurs independently of any data connection between the accessory device and the handheld device.

2. The accessory device of claim 1, wherein the coupling element is configured to employ the first input of the handheld device to a purpose other than that the first input has when the accessory device is not attached to the handheld device.

3. The accessory device of claim 1, wherein the accessory device is a cover.

4. The accessory device of claim 1, wherein the accessory device is configured to enable the handheld device to detect deformation of the accessory device when attached to the handheld device by using the coupling element.

5. The accessory device of claim 4, wherein the first user action is deformation of the accessory device that occurs after the accessory device has been attached to the handheld device and the deformation is caused by a user of the handheld device bending, twisting, squeezing or stretching the accessory device.

6. The accessory device of claim 4, wherein the enabling of the handheld device to detect the deformation of the accessory device is provided without any data connection between the handheld device and the accessory device.

7. The accessory device of claim 1, further comprising an attachment indicator configured to enable the handheld device to detect, using one or more second inputs of the handheld device, that the accessory device is attached to the handheld device.

8. The accessory device of claim 1, wherein the coupling element is configured to form a capacitive coupling.

9. The accessory device of claim 8, wherein the coupling element is configured to form a capacitive coupling with one or more predetermined parts of a capacitive touch screen in the handheld device.

10. The accessory device of claim 9, wherein the accessory device comprises conductive material configured to connect a user's finger to the capacitive touch screen via the coupling element from a position outside an area defined by the capacitive touch screen.

11. The accessory device of claim 10, wherein the coupling element is a multi-branch conductor with a plurality of individual patches configured to each align with at least one capacitive sensor of the capacitive touch screen.

12. The accessory device of claim 1, wherein the coupling element is configured to form a multi touch pattern that is unlikely to be created by human fingers.

13. The accessory device of claim 12, wherein the multi touch pattern comprises a plurality of discrete capacitive contact points in close proximity of one another such that it is unlikely for a user to create the multi-touch pattern by the user touching the touch screen with the user's fingers.

14. The accessory device of claim 1, wherein the coupling element is configured to form an optical coupling.

15. The accessory device of claim 1, wherein the coupling element is configured to form a magnetic coupling.

16. The accessory device of claim 1, wherein the first user action is deformation of the accessory device that occurs after the accessory device has been attached to the handheld device.

17. A method in an accessory device that is adapted for attaching to a handheld device, the method comprising:
forming a coupling with a first input of the handheld device, wherein the first input of the handheld device is at least one of a proximity sensor, a camera, an ambient light sensor, a microphone, an accelerometer, a magnetometer or one or more input keys;
receiving user input; and
conveying a predetermined signal from the accessory device to the first input of the handheld device, wherein the conveying of the predetermined signal is in response to the receiving of user input using the formed coupling and occurs independently of any data connection between the accessory device and the handheld device.

18. The method of claim 17, wherein the handheld device is caused to employ the first input to a purpose other than that the first input has when the accessory device is not attached to the handheld device.

* * * * *